US009135468B2

(12) United States Patent
Ando

(10) Patent No.: US 9,135,468 B2
(45) Date of Patent: Sep. 15, 2015

(54) APPARATUS, METHOD, AND COMPUTER-READABLE RECORDING MEDIUM FOR ACCESS CONTROL

(75) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 833 days.

(21) Appl. No.: 12/423,884

(22) Filed: Apr. 15, 2009

(65) Prior Publication Data

US 2009/0276826 A1 Nov. 5, 2009

(30) Foreign Application Priority Data

Apr. 30, 2008 (JP) ................................ 2008-118619

(51) Int. Cl.

*G06F 17/30* (2006.01)
*G06F 21/62* (2013.01)
*G06F 21/60* (2013.01)
*G06F 21/84* (2013.01)

(52) U.S. Cl.

CPC ............ *G06F 21/629* (2013.01); *G06F 21/608* (2013.01); *G06F 21/84* (2013.01); *G06F 2221/2141* (2013.01)

(58) Field of Classification Search

USPC ....................................... 713/189; 726/26, 27
See application file for complete search history.

(56) References Cited

U.S. PATENT DOCUMENTS 5,987,611 A * 11/1999 Freund .............................. 726/4
6,289,462 B1 * 9/2001 McNabb et al. ................ 726/21
6,850,943 B2 * 2/2005 Teixeira et al. ....................... 1/1
2004/0019565 A1 * 1/2004 Goringe et al. ................. 705/59
2004/0193987 A1 * 9/2004 Sigbjornsen et al. ......... 714/741
2008/0005029 A1 1/2008 Ando
2008/0014912 A1 1/2008 Otaka et al.
2009/0328169 A1 * 12/2009 Hutchison et al. ................ 726/7

FOREIGN PATENT DOCUMENTS

JP 2005-250974 9/2005
JP 2005-269619 9/2005
JP 2006-079211 3/2006
JP 2008-016013 1/2008
WO WO 2004/102394 A1 11/2004

OTHER PUBLICATIONS

Japanese Office Action dated Jul. 30, 2013.

* cited by examiner

*Primary Examiner* — Christopher Brown
(74) *Attorney, Agent, or Firm* — IPUSA, PLLC

(57) ABSTRACT

There is disclosed an image forming apparatus to which one or more programs can be added. The image forming apparatus includes a managing part configured to manage access authorization information set for each of groups into which the programs are categorized, a displaying part configured to display a setting screen in which access authorization setting information is set in correspondence with each of the programs, a changing part configured to change a range of access authorization granted to the programs according to access authorization change information, the access authorization change information including definitions of change information corresponding to the access authorization setting information set in the setting screen, and a determining part configured to determine whether the access authorization can be granted to the programs.

18 Claims, 18 Drawing Sheets

```
71 —— grant signedBy "Lv1" {
        permission java.lang.RuntimePermission "accessClassInPackage.*";  ~~ (a)
        permission java.lang.RuntimePermission "loadLibrary.*";            ~~ (b)
        permission java.io.FilePermission "<<ALL FILES>>", "read,write";   ~~ (c)
        ..
     }
72 —— grant signedBy "Lv2" {
        ..
     }
73 —— grant signedBy "Lv3" {
        ..
     }
```

```
grant [CalledBy "from_class_name.to_class_name"]
      [,State "State_name"]
      [,SignedBy "signer_names"]
      [, CodeBase "URL"]
      [, Principal [principal_class_name] "principal_name"]
      [, Principal [principal_class_name] "principal_name"] ... {
   permission permission_class_name [ "target_name" ]
              [, "action"] [, SignedBy "signer_names"]
              [,CalledBy "from_class_name.to_class_name"]
              [,State "State_name"] ;
   permission ...
};
```

FIG.11

```
51
<?xml version="1.0" encoding="utf-8"?> <!-- JNLP File for ScanApp Application -->
 <dalp spec="1.0+" codebase="sdcard://dsdk/0123" href="dsdk_scan.jnlp">          510
  <information>
   <title>ScanApp</title> 511
   <vendor>DSDK Providers Inc.</vendor> 512
   <telephone>xxxx-xxxx-xxxx</telephone> 513
   <fax>xxxx-xxxx-xxxx</fax> 514
   <email>xxxx@yyy</email> 515
   <product-id>123456789</product-id> 516
   <description>Transfer Scanned File By Electronic Mail</description> 517
   <icon href="images/DSDK_scan.jpg"/> <offline-allowed/> 518
  </information>
  <resources>
   <dsdk version="1.0"/> 521   522
   <jar href="ScanApp.jar" version="2.00">   524
    <security.patch comment="Refer To Password File">          523
     grant signedBy "Lv3" {
      permission java.io.FilePermission "Password.txt", "read" ,CalledBy "Password:getPassWord", State passwdFlag==1 5231
      permission java.security.AllPermission State performanceFlag==2 , CalledBy "Apli1:init" 5232
      permission java.security.AllPermission State peformancefFlag==3 , CalledBy "Apli1:dispPassWord" 5233
     }
    </security.patch>
   </jar>
   <sub-jnlp href="http://www.rrr.com/dsdk/ocr.jnlp>
  </resources>          520
  <update mode=auto>
  <mail address="xxx@yyy.zzz.co.jp"/>
  </update>
  <install mode="auto">
   <destination path="sdcard:/badk/0123"/>
  </install>
 <xlet-desc class="ScanApp"/ type="deamon">
</dalp>
```

FIG.18

| ITEM | ENTRY EXAMPLE |
|---|---|
| : | : |
| SERVICE BUNDLE | SCANNING SERVICE |
| SECURITY LEVEL | Lv3 |
| SECURITY PATCH | permission java.io.FilePermission "Password.txt", "read" ,CalledBy "Password:getPassWord" |
| SECURITY PATCH REASON | PASSWORD FILE IS REFERRED |
| PERFORMANCE | a) PRIORITIZE SECURITY<br>b) OPTIMUM<br>Apli1.init<br>"SECURITY CHECK OF INITIALIZATION INVALID"<br>c) PRIORITIZE PERFORMANCE<br>Apli1:dispPassWord<br>"SECURITY CHECK OF PASSWORD DISPLAY INVALID" |

APPARATUS, METHOD, AND COMPUTER-READABLE RECORDING MEDIUM FOR ACCESS CONTROL

BACKGROUND OF THE INVENTION

1. Field of the Invention

The present invention relates to an image forming apparatus, an access controlling method, and a computer-readable recording medium for access control.

2. Description of the Related Art

In recent image forming apparatuses such as multifunction machines, there are image forming apparatuses that allow new applications to be developed and installed therein after the image forming apparatuses have been shipped (see, for example, Japanese Laid-Open Patent Publication No. 2005-269619). That is, new applications using a publicly available API (Application Program Interface) written in general programming languages such as C language or Java (Registered Trademark) are developed and installed in image forming apparatuses after the image forming apparatuses have been shipped. These image forming apparatuses not only may allow applications developed by the vendor of the image forming apparatuses to be installed but may also allow applications developed by other software vendors to be installed. Under such circumstance where new applications are installed and used by vendors of the image forming apparatuses and other software vendors, undesired events (e.g., leakage of confidential information, inappropriate operation of the image forming apparatus) may occur if access to resources (e.g., programs, data) of the image forming apparatuses are unconditionally permitted. Therefore, appropriate security management (access control) is required for each application.

In a Java (Registered Trademark) application, code-based access control can be performed with a security mechanism being provided as standard equipment to an execution environment of Java (Registered Trademark). For example, access authorization (permission) can be set in correspondence with the location of a program or a person of a signature of program inside data referred to as “policy”. However, defining the policies for each application (each program) is burdensome for an administrator and increases the data amount (information amount) of the policies. This may result in degrading of performance.

Therefore, applications are, for example, classified into different groups (or divided into different levels) according to the credibility of each application and access authorizations are set in units of each group (or level) inside the policy. In this case where applications are classified into different groups (or divided into different levels), the process of classifying the applications would be meaningless if the grading of the groups (grades of the levels) become too minute. Thus, the classifying is effective where the applications are classified into substantially large groups (reducing the number of grades of the levels).

However, there may be a case where a part of access authorization required for executing a function of an application is beyond an access authorization range granted to the group to which the application belongs. That is, there may be a case where a function of an application cannot be realized unless greater access authorization is granted to the application. However, when the range of access authorization granted to the group to which the application belongs is changed (expanded) to a larger range, the access authorization granted to the application may be too large compared to the credibility of the application. There is a desire for a system that can grant access authorization to a particular application as an exception where the access authorization is forbidden to the group to which the application belongs.

SUMMARY OF THE INVENTION

The present invention may provide an image forming apparatus, an access controlling method, and a computer-readable recording medium that substantially eliminate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming apparatus, an access controlling method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image forming apparatus to which one or more programs can be added, the image forming apparatus including: a managing part configured to manage access authorization information set for each of groups into which the programs are categorized; a displaying part configured to display a setting screen in which access authorization setting information is set in correspondence with each of the programs; a changing part configured to change a range of access authorization granted to the programs according to access authorization change information, the access authorization change information including definitions of change information corresponding to the access authorization setting information set in the setting screen; and a determining part configured to determine whether the access authorization can be granted to the programs.

Furthermore, another embodiment of the present invention provides an access controlling method executed by an image forming apparatus to which one or more programs can be added, the method including the steps of: managing access authorization information set for each of groups into which the programs are categorized; displaying a setting screen in which access authorization setting information is set in correspondence with each of the programs; changing a range of access authorization granted to the programs according to access authorization change information, the access authorization change information including definitions of change information corresponding to the access authorization setting information set in the setting screen; and determining whether the access authorization can be granted to the programs.

Furthermore, yet another embodiment of the present invention provides a computer-readable recording medium on which a program for causing an image forming apparatus to execute an access controlling method is recorded, the image forming apparatus being able to have one or more programs added, the access controlling method including the steps of: managing access authorization information set for each of groups into which the programs are categorized; displaying a setting screen in which access authorization setting information is set in correspondence with each of the programs; changing a range of access authorization granted to the programs according to access authorization change information, the access authorization change information including definitions of change information corresponding to the access authorization setting information set in the setting screen; and determining whether the access authorization can be granted to the programs.

Other objects, features and advantages of the present invention will become more apparent from the following detailed description when read in conjunction with the accompanying drawings.

BRIEF DESCRIPTION OF THE DRAWINGS

FIG. 6 is a schematic diagram illustrating an example of a format of the security patch;

FIG. 11 illustrates examples of definitions of a application management file;

FIG. 18 is a schematic diagram illustrating an example of an application development request form.

DETAILED DESCRIPTION OF THE PREFERRED EMBODIMENTS

Figure 1:
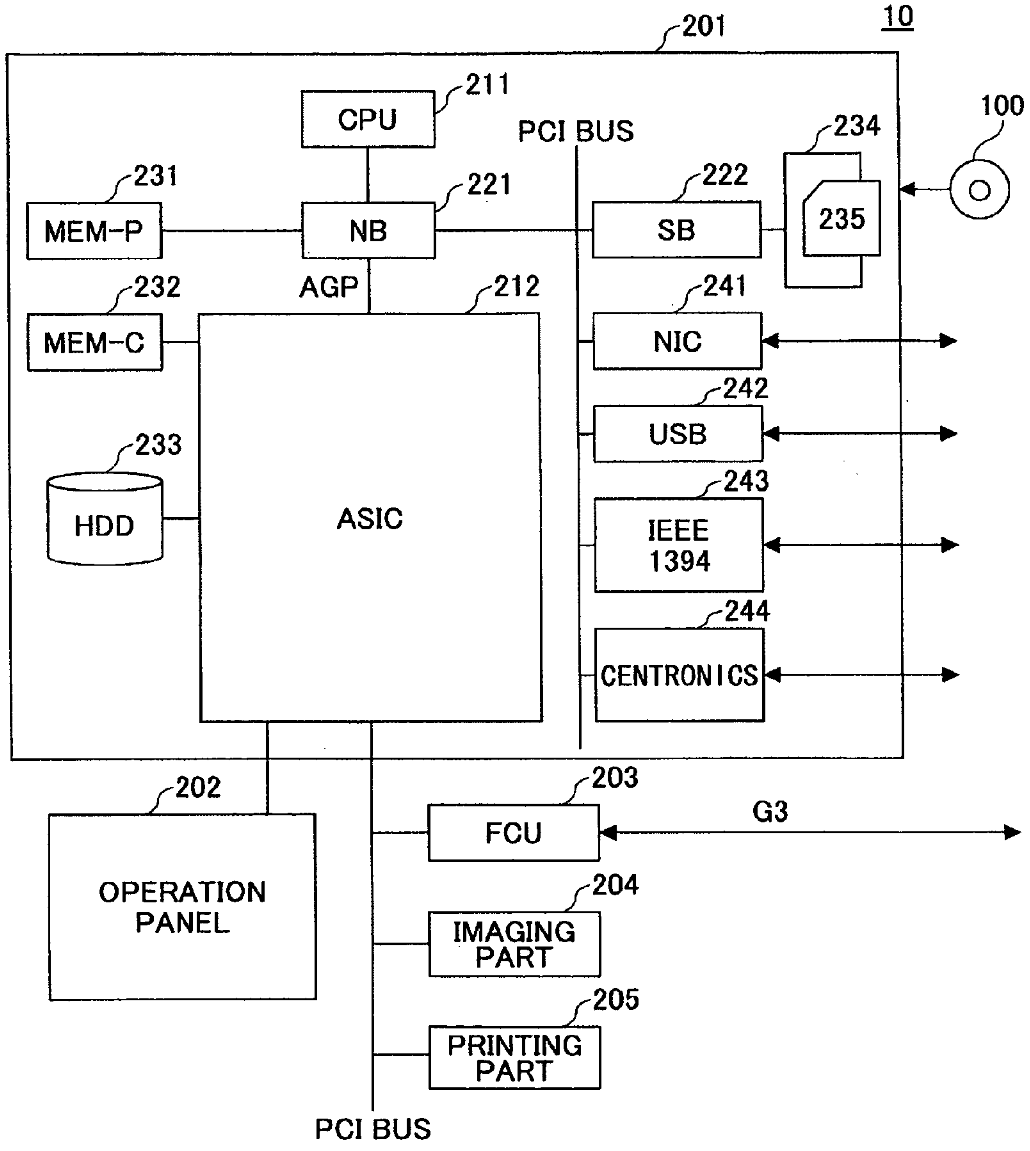
FIG. 1 is a schematic diagram illustrating a hardware configuration of a multifunction machine (image forming apparatus) according to an embodiment of the present invention.

FIG. 1 is a schematic diagram illustrating a hardware configuration of a multifunction machine (image forming apparatus) 10 according to an embodiment of the present invention. The multifunction machine 10 illustrated in FIG. 1 includes, for example, a controller 201, an operations panel 202, a facsimile control unit (FCU) 203, and an imaging part 204, and a printing part 205.

In this embodiment, the controller 201 includes a CPU (Central Processing Unit) 211, an ASIC (Application Specific Integrated Circuit) 212, a NB (North Bridge) 221, a SB (South Bridge) 222, a MEM-P (Memory-P) 231, a MEM-C (Memory-C) 232, a HDD (Hard Disk Drive) 233, a memory card slot 234, a NIC (Network Interface Controller) 241, a USB device 242, a IEEE 1394 device 243, and a Centronics device 244. The below-described embodiment of a process (function) of controlling access may be executed with a program recorded on a computer-readable recording medium 100 that is loaded to the image forming apparatus 10.

In this embodiment, the CPU 211 is an IC (Integrated Circuit) for performing various data processes. The ASIC 212 is an IC for performing various image processes. The NB 221 is a north bridge of the controller 201. The SP 222 is a south bridge of the controller 201. The MEN-P 231 is a system memory of the multifunction machine 10. The MEM-C 232 is a local memory of the multifunction machine 10. The HDD 233 is a storage device of the multifunction machine 10. The memory card slot 234 is a slot for inserting a memory card 235 into. The NIC 241 is a controller for network communications according to MAC addresses. The USB device 242 is a device for providing connections with USB standard terminals. The IEEE 1394 device 243 is a device for providing connections with IEEE 1394 standard terminals. The Centronics device 244 is a device for providing connections with Centronics specification terminals.

The operations panel 202 is an operating part for enabling an operator (user) to input data into the multifunction machine 10. The operations panel 202 is also a display part for enabling the operator to obtain output from the multifunction machine 10.

Figure 2:
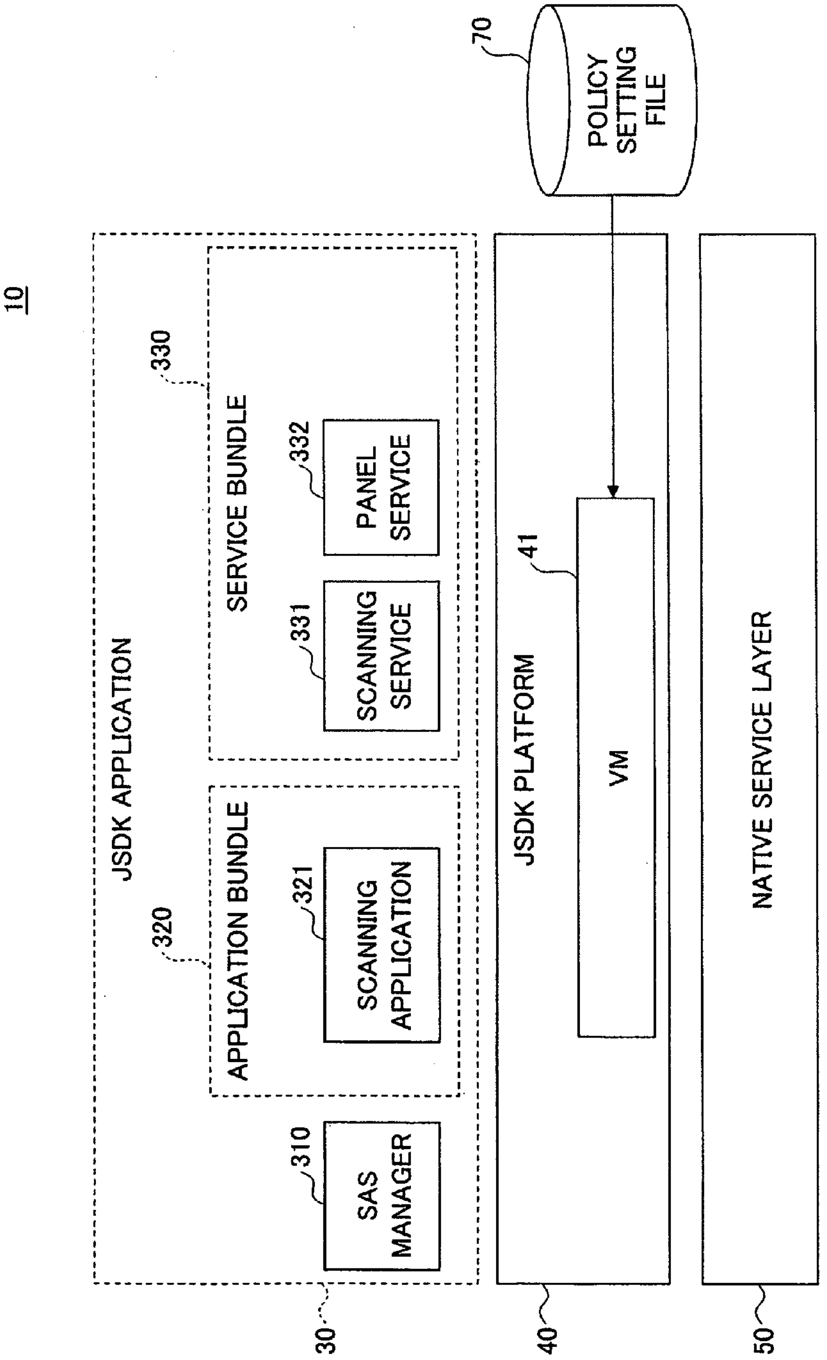
FIG. 2 is a schematic diagram illustrating a software configuration of a multifunction machine according to an embodiment of the present invention.

FIG. 2 is a schematic diagram illustrating a software configuration of the multifunction machine 10 according to an embodiment of the present invention. In FIG. 2, the software of the multifunction machine 10 includes, for example, a JSDK (Java Servlet Development Kit) application 30, a JSDK platform 40, and a native service layer 50. The processes (functions) included in the software are executed by the CPU 211.

The native service layer 50 provides interfaces that enable upper layer modules to use functions provided by the hardware and the software of the multifunction machine 10 and performs controls to realize the functions in response to calls requesting the interfaces (requests to use the functions). For example, the native service layer 50 includes a module for providing an interface related to controlling network communications, a module for providing an interface related to controlling a facsimile, a module for providing an interface related to controlling delivery of stored documents (document (image) data stored in the HDD 233), a module for providing an interface related to controlling the imaging part 204 or the printing part 205, a module for providing an interface related to controlling the memory 231, 232 or the HDD 233, a module for providing an interface related to controlling the operations panel 202, a module for providing an interface related to controlling an authorizing process or a billing process, and a module for providing an interface related to managing user data.

The JSDK platform 40 is a software platform for providing an execution environment of the JSDK application 30. The JSDK platform 40 provides Java (Registered Trademark) interfaces associated with the native service layer 50 with respect to upper layer modules. The JSDK platform 40 includes, for example, classes of Java (Registered Trademark) standard, a class library related to classes expanded for the multifunction machine 10, and a Java (Registered Trademark) virtual machine (VM) 41.

The VM 41 controls execution of the JSDK application 30 while sequentially interpreting Java (Registered Trademark) byte codes. As part of controlling the execution of the JSDK application 30, the VM 41 controls access of the JSDK application 30 with respect to resources such as files, network sockets, and printers according to a policy defined beforehand by the policy configuration file 70. In other words, as a Java (Registered Trademark) standard mechanism, the VM 41 is configured to report (call) to an instance (Security Manager object) of a Security Manager class when access is made to a resource. In response to the report (call) from the VM 41, the Security Manager object determines whether access to the resource is permissible according to the policy configuration file 70.

The JSDK platform 40 is loaded as an OSGI (Open Service Gateway initiative) platform. The OSGi platform, which is standard technology by the OSGi alliance, is a software platform for providing an execution environment of software components fabricated according to open software modularization technology based on Java (Registered Trademark) language. In the OSGi platform, the Java (Registered Trademark) language software is loaded in a form of a software component referred to as a "bundle". A single bundle is composed of a single JAR (Java ARchive). Each bundle can be dynamically installed without requiring rebooting of the multifunction machine 10.

The JSDK application 30 is an application fabricated by a dedicated SDK (Software Development Kit) disclosed in the JSDK platform 40 (hereinafter referred to as "SDK application"). Thus, among the SDK applications, an application developed by using Java (Registered Trademark) is referred to as a JSDK application.

In FIG. 2, the JSDK application 30 includes, for example, a SAS (SDK Application Service) manager 31, an application bundle 320, and a service bundle 330. The SAS manager is for controlling, for example, installing (addition), uninstalling (deletion), booting, and cancelling booting of other JSDK applications 30 (e.g., application bundle 320, service bundle 330).

The application bundle 320 serves as a bundle of the JSDK application 30 for displaying a control screen in the operations panel 202 and allowing an end user to directly operate on (use) the control screen. In FIG. 2, a scanning application 321 is illustrated as an example of the application bundle 320. The scanning application 321 is an application for enabling an image to be read from a document by the imaging part 204.

The service bundle 330 serves as a bundle of the JSDK application 30 for providing services to, for example, the application bundle 320. That is, each service of the service bundle 330 executes a process corresponding to the service bundle 330 in response to a call (request) from, for example, the application bundle 320 and returns a result of the process (process result) to the application bundle 320. In FIG. 2, a scanning service 331 and a panel service 332 are illustrated as examples of the service bundle 330.

The scanning service 331 provides a service related to a function of reading images. The panel service 332 provides a service related to controlling the displaying of the operations panel 202.

Next, management of security related to the JSDK application 30 in the multifunction machine 10 is described. As described above, the JSDK application 30 is a Java (Registered Trademark) application developed using a SDK disclosed in the JSDK platform 40. Therefore, an application developed by a third-party vendor or the like after shipment of the multifunction machine 10 may be installed in the multifunction machine 10 as the JSDK application 30.

Accordingly, the multifunction machine 10 conducts code-based access control by dividing the range of access authorization for resources of the multifunction machine 10 into levels (hereinafter referred to as "security levels") (categorized into groups) and assigning a security level to each JSDK application 30 in correspondence with the credibility of each JSDK application 30. The security level can be identified (distinguished) according to a signature (electronic signature) attached to each JSDK application 30.

Figure 3:
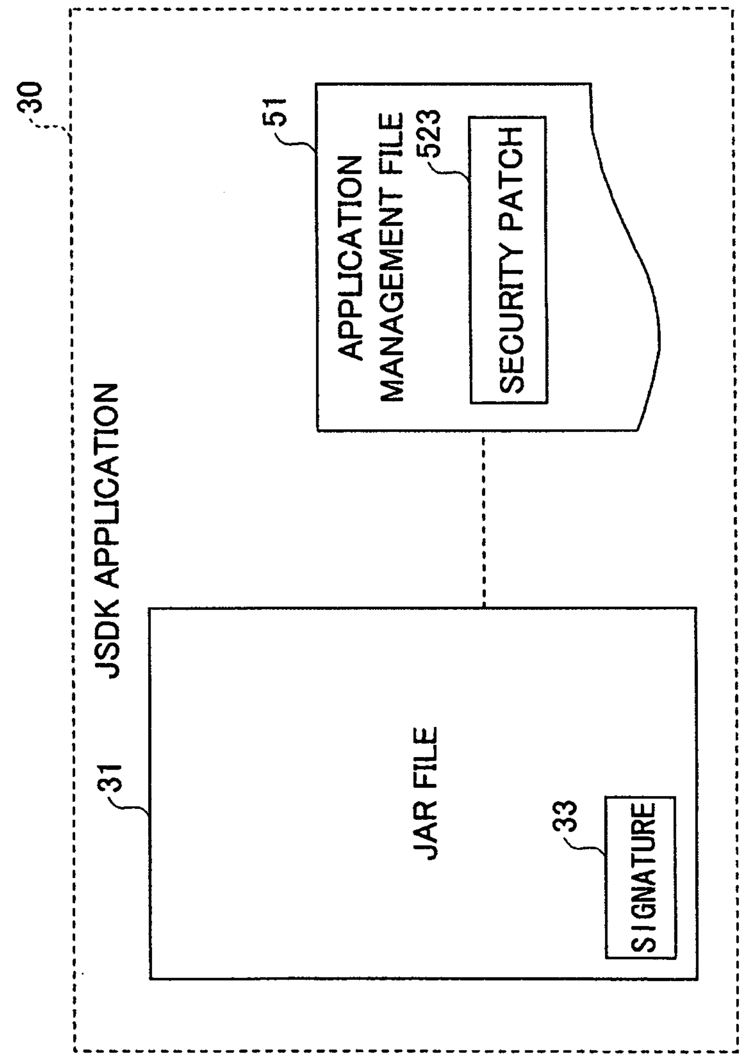
FIG. 3 is a schematic diagram illustrating a configuration of a Java Servlet Development Kit (JSDK) application according to an embodiment of the present invention.

FIG. 3 is a schematic diagram illustrating a configuration of the JSOK application 30 according to an embodiment of the present invention. As illustrated in FIG. 3, each JSDK application 30 includes files such as a JAR file 31 and an application management file 51. A signature 33 attached (associated) to the JAR file 31 corresponds to a signature for identifying the security level. The signature 33 is, for example, encrypted with a hash value of the JAR file 31. The security level is identified with an encryption key used for encrypting the signature 33. Besides being used for identifying the security level, the signature 33 is also used for determining whether the JSDK application 30 has been tampered with. It is to be noted that, in this embodiment, the security level is divided into three stages of different value. The values of the three stages are level 1 (Lv1), level 2 (Lv2), and level 3 (Lv3). Level 1 (Lv1) has the highest access authorization. Level 3 has the lowest access authorization.

The access authorization of each security level is defined in the policy configuration file 70 according to specifications of the Java (Registered Trademark) standard.

Figure 4:
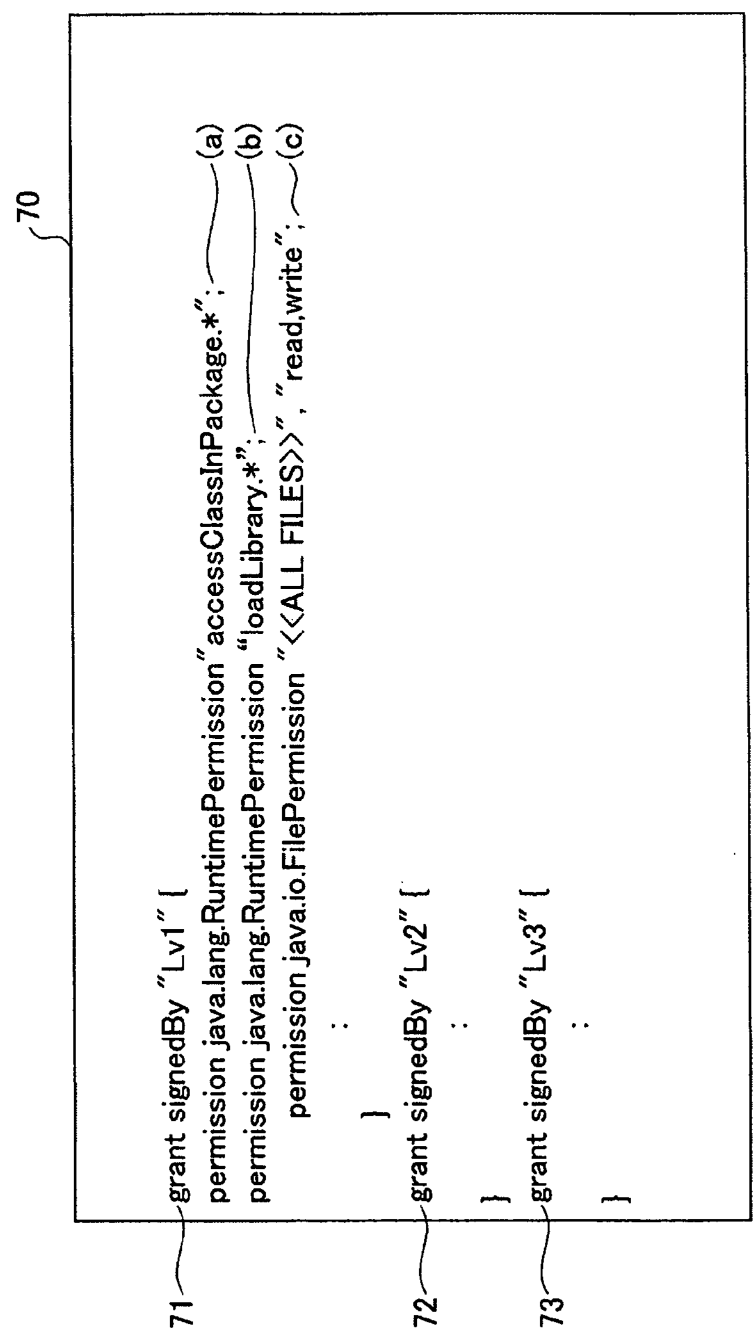
FIG. 4 is a schematic diagram illustrating an example of a definition of a policy configuration file according to an embodiment of the present invention.

FIG. 4 is a schematic diagram illustrating an example of a definition of the policy configuration file 70 according to an embodiment of the present invention. In FIG. 4, because the format of the policy configuration file 70 complies with the specifications of the Java (Registered Trademark) standard, details of the format of the policy configuration file 70 are omitted.

In FIG. 4, three grant entries 71-73 are illustrated. The Lv1 is designated in the field "Signed By" of the grant entry 71. Therefore, the definition of the grant entry 71 is applied to the JSDK application 30 having attached the signature 33 with a security level value of Lv1. Likewise, the definition of the grant entry 72 is applied to the JSDK application 30 having attached the signature 33 with a security level value of Lv2, and the definition of the grant entry 73 is applied to the JSDK application 30 having attached the signature 33 with a security level value of Lv3.

As illustrated in (a) of the grant entry 71 of FIG. 4, the grant entry 71 is set so that all of the packages ("accessClassInPackage.*") can be accessed during operation (i.e. when the JSDK application 30 of Lv1 is being executed) ("RuntimePermission"). Further, as illustrated in (b) of the grant entry 71 of FIG. 4, the grant entry 71 is set so that dynamic link to all of the libraries can be performed. Further, as illustrated in (c) of the grant entry 71 of FIG. 4, the grant entry 71 is set so that reading ("read") and writing ("write") can be performed on all files in the file system.

Accordingly, in the policy configuration file 70 access authorization is defined in correspondence with the security level. Therefore, with the multifunction machine 10, the access authorization of the JSDK application 30 is determined according to the security level corresponding to the signature 33 attached to each JSDK application 30.

Figure 5:
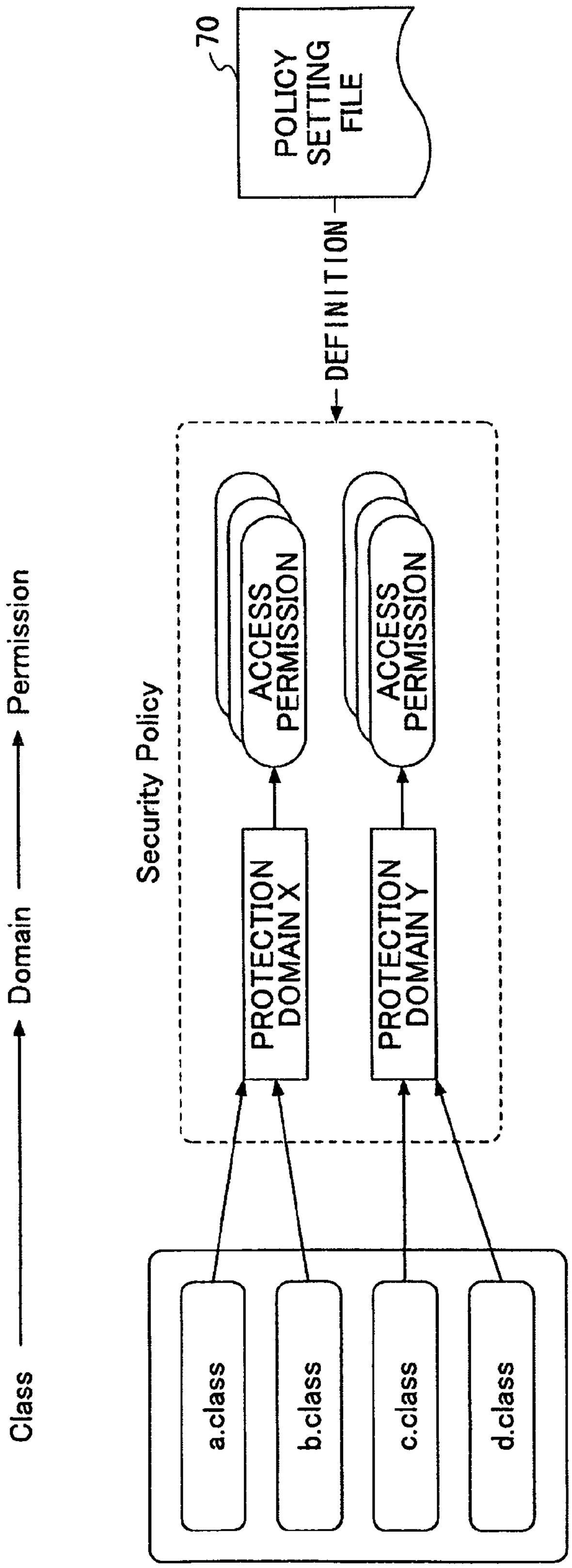
FIG. 5 is a schematic diagram for describing a Protection Domain.

Each security level (Lv1, Lv2, Lv3) forms a Protection Domain according to Java (Registered Trademark). FIG. 5 is a schematic diagram for describing a Protection Domain. The Protection Domain is a set of objects that can be currently directly accessed by the JSDK application 30 or instances of classes included in the JSDK application 30 (i.e. a set of permissions). In FIG. 5, Protection Domain X is applied to a.class and b.class, and Protection Domain Y is applied to c.class and d.class. In other words, permissions belonging to the Protection Domain X are granted to the a.class and the b.class. Likewise, permissions belonging to the Protection Domain Y are granted to the c.class and the d.class. In FIG. 5, a single "Permission" is assumed as a single permission in the policy configuration file 70. Further, a single Protection Domain is assumed to correspond to a single grant entry. Thus, with the multifunction machine 10 according to an embodiment of the present invention, a protection domain corresponding to Lv1, a protection domain corresponding to Lv2, and a protection domain corresponding to Lv3 are formed.

Returning to FIG. 3, the application management file 51 is a file to which various data are defined. For example, data regarding elements of the JSDK application 30, data for installing and booting the JSDK application 30, and other data for management are defined in the application management file 51. For example, the application management file 51 may be associated with the JAR file 31 according to file name. In this embodiment, the application management file 51 includes a security patch 523. The security patch 523 is a patch (change information or difference information) with respect to definitions of the policies that are statically set in the policy configuration file 70. The multifunction machine 10 can dynamically change the definitions of the policy configuration file 70 by applying the security patch 523 associated with the JSDK application 30 when executing the JSDK application 30 (this function of the multifunction machine 10 is hereinafter referred to as "policy dynamic changing function").

FIG. 6 is a schematic diagram illustrating an example of a format of the security patch 523. As illustrated in FIG. 6, the format of the security patch 523 basically complies with the format of the policy of the Java (Registered Trademark) standard. In this embodiment, the part delineated with broken lines is expanded. That is, a CalledBy field and a State field may be added to the grant entry and the permission entry.

A validation timing (timing in which the entry (grant entry or permission entry) with the CalledBy field added becomes valid) is assigned to the CalledBy field. The timing is identified according to the call (request) for a method. The CalledBy field is written in a format "CalledBy "from_class name. to_class name" in which "from_class name" is written in a format "<class name of origin of call>: <method name>", and "to_class_name" is written in a format "class name of destination of call>: <method name>. However, the method name and the class name of the origin of a call can be omitted.

Examples of formats of ["from_class_name. to_class_name"] and their meaning are described below.

(1) "Password: getPassWord"

In this case, a corresponding entry is validated (change of policy) when a getPassWord method of a PassWord class is called.

(2) "Apli1:dispPassWord.Password:getPassWord"

In this case, a corresponding entry is validated when a getPassWord method of a Password class is called by a dispPassWord method of an Apli1 class.

(3) "Password"

In this case, the policy is changed when any method of the Password class is executed.

Figure 7:
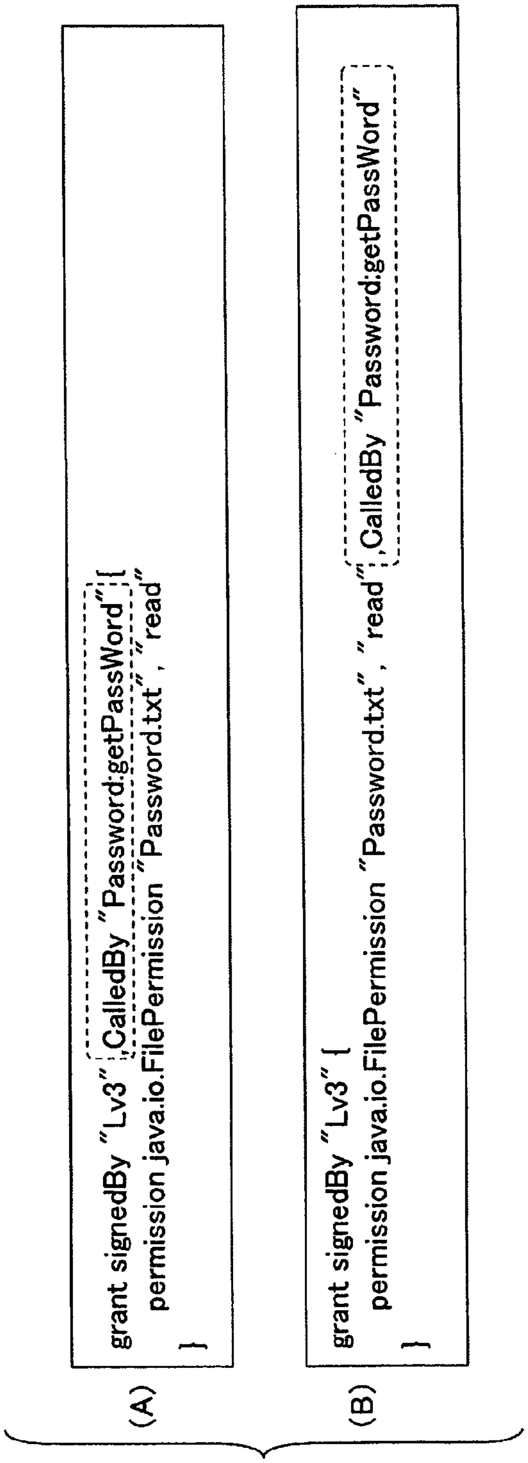
FIG. 7 is a schematic diagram illustrating written examples of the CalledBy field.

For example, FIG. 7 is a schematic diagram illustrating written examples of the CalledBy field. In FIG. 7, entries (A) and (B) are defined substantially the same. That is, in a case where a getPassWord of a Password class is called, the CalledBy field (part surrounded by broken lines in FIG. 7) defines that permission (authorization) for reading a password file (Password.txt) is granted. (A) of FIG. 7 illustrates a case where the CalledBy field is added to the grant entry. Accordingly, when other permission entries are included in the grant entry where the CalledBy field is added to the grant entry, the CalledBy field has an effect on the other permission entries.

Further, a multifunction machine status (status of the multifunction machine 10 in which the entry with a State field added becomes valid) is assigned to the State field. The State field is written in a format ["State State_name"]. A character string or numeral that specifies a status is written in the "State_name".

For example, in a case where a fixed parameter is predetermined for identifying a status, the state field can be written as follows.

Figure 8:
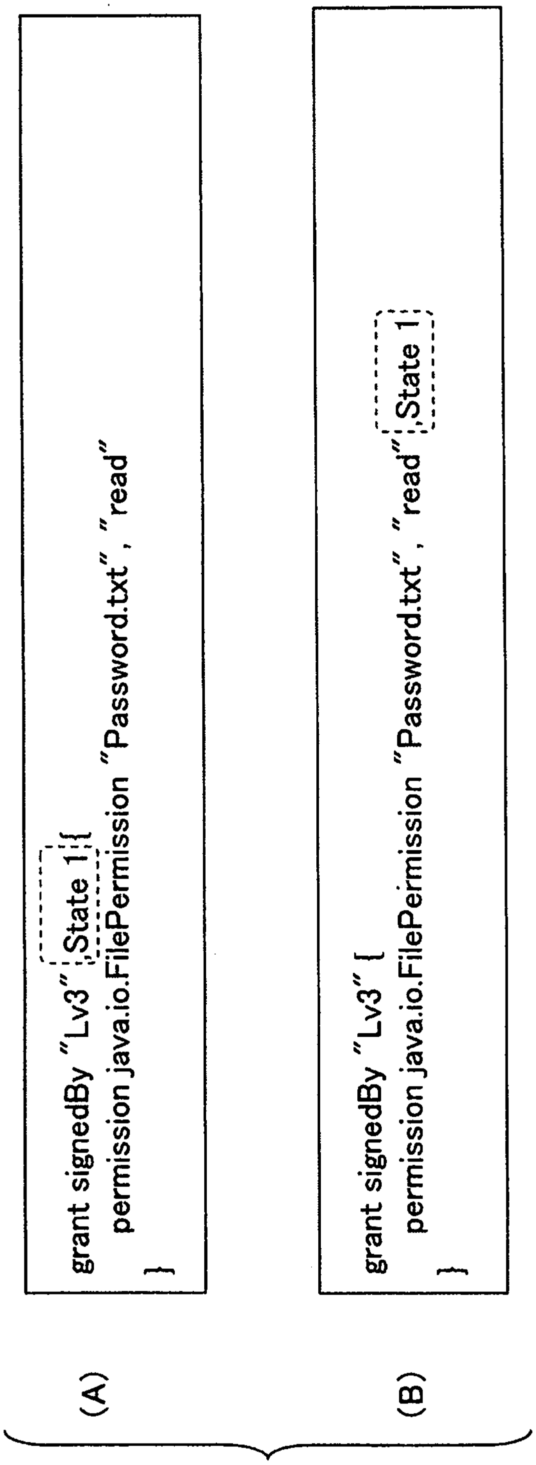
FIG. 8 is a schematic diagram illustrating a first written example of a State field.

FIG. 8 is a schematic diagram illustrating a first written example of a State field. In FIG. 8, entries (A) and (B) are defined substantially the same. That is, in a case where the value of the predetermined parameter is "1", the State field (part surrounded by broken lines in FIG. 8) defines that permission (authorization) for reading a password file (Password.txt) is granted. (A) of FIG. 8 illustrates a case where the State field is added to the grant entry. Accordingly, when other permission entries are included in the grant entry where the State field is added to the grant entry, the State field has an effect on the other permission entries.

Further, in a case of specifying the parameter for identifying a status of the multifunction machine 10 with the State field, the State field may be as described as follows.

Figure 9:
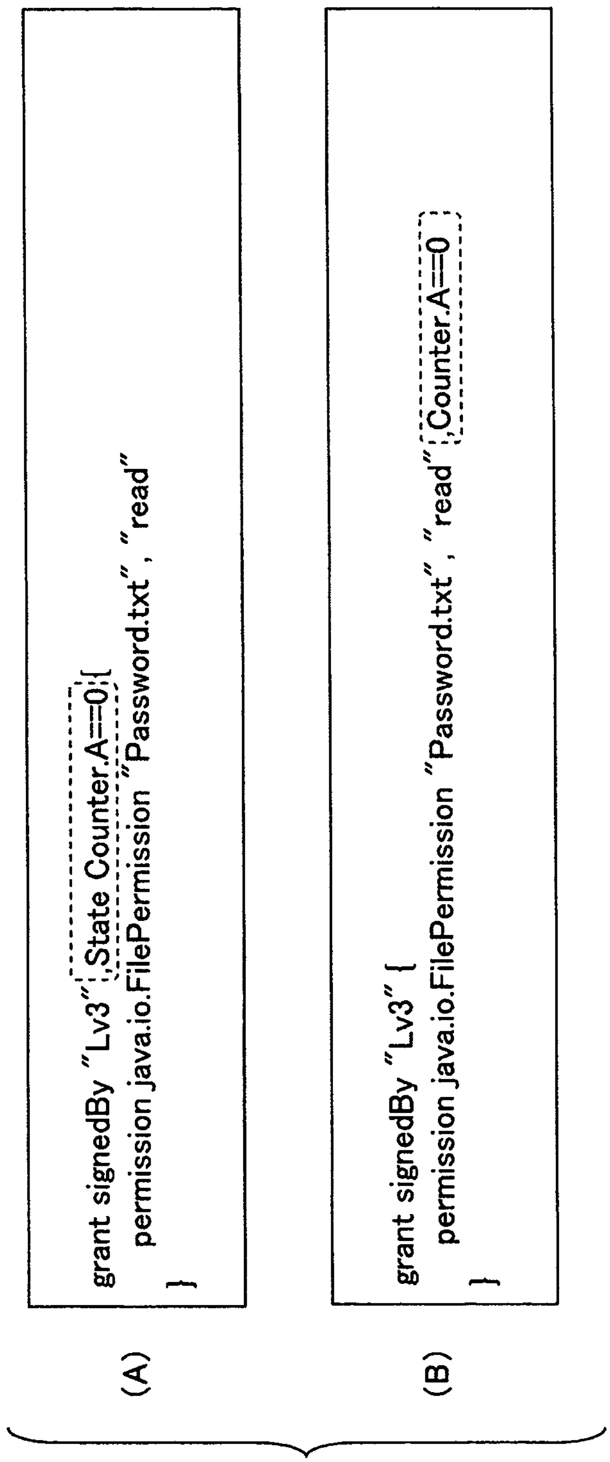
FIG. 9 is a schematic diagram illustrating a second written example of a State field.

FIG. 9 is a schematic diagram illustrating a second written example of a State field. In FIG. 9, the State field is described as "State Counter. A==0". This State field specifies that the status of the parameter "counter. A" is "0". That is, the State field defines that permission to read a password file (Password. txt) is granted in a case where the parameter "counter. A" is 0.

In this embodiment, when a Calledby field and a State field define the same entry, the validity of the entry is determined by applying an AND condition with respect to the two fields. Alternatively, the validity may be determined by applying an OR condition with respect to the two fields.

Figure 10:
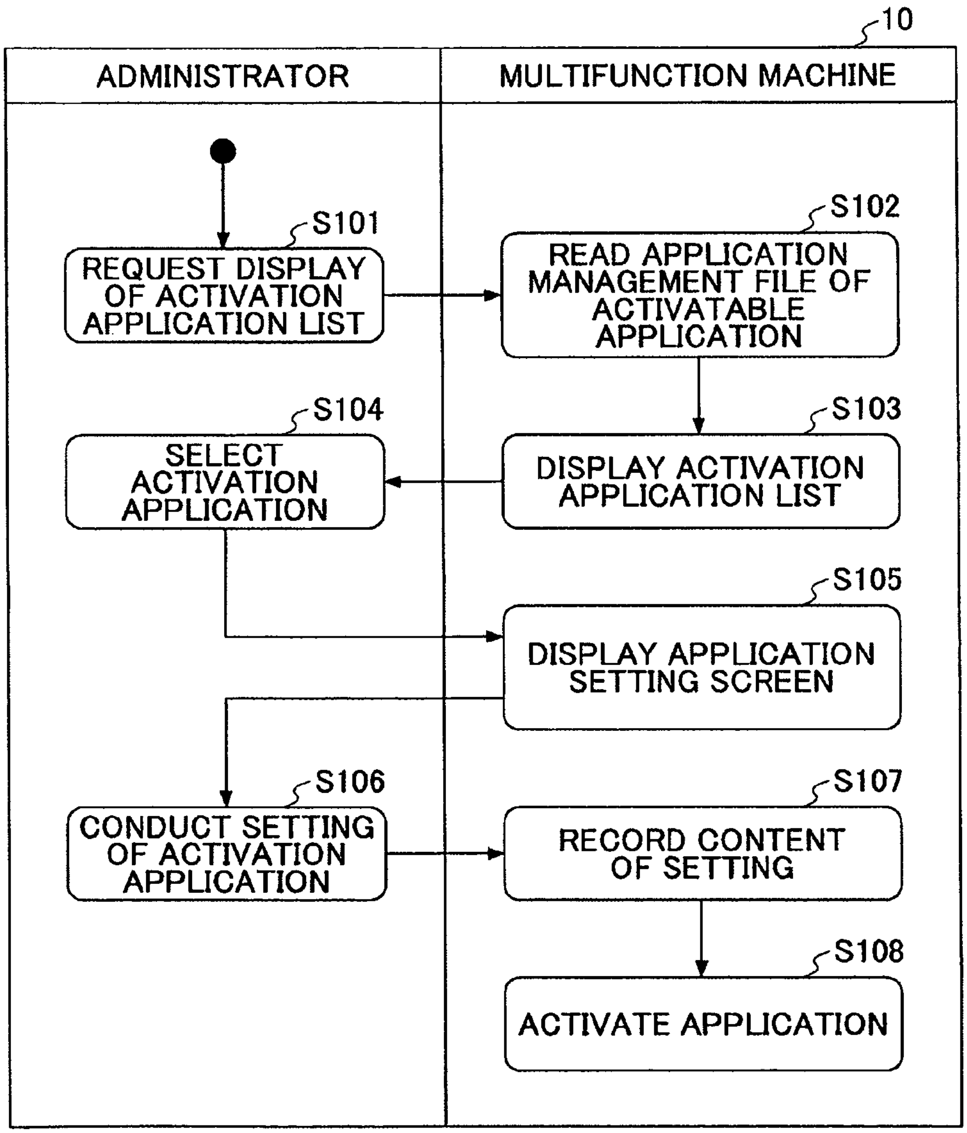
FIG. 10 is a schematic diagram illustrating processes executed by a JSDK application.

Next, processes executed by the multifunction machine 10 according to an embodiment of the present invention are described. FIG. 10 is a schematic diagram illustrating processes executed by the JSDK application 30.

When a user (e.g., administrator) inputs a request to display a list of activatable JSDK applications 30 via the operations panel 202 (Step S101), the SAS manager 310 reads the application management files 51 corresponding to each activatable application installed in the multifunction machine 10 (Step S102). Based on definition data of the application management file 51, an application list screen is displayed on the operation panel 202 (Step S103).

FIG. 11 illustrates examples of definitions of the application management file 51. The examples of definitions illustrated in FIG. 11 are expressed in a format extending JNLP (Java Network Launching Protocol (JSR-56 specification) based on an XML (eXtensible Markup Language) format.

In FIG. 11, the definition data of the application management file 51 include, for example, an information element 510 encompassed with a <information> tag and a resource element 520 encompassed with a <resources> tag.

Mainly, information regarding the application and information for identifying the maker of the application are described in the information element 510. That is, a title of the application (application name) is written in a title element 511. A name (vendor name), a telephone number, a facsimile number, and an e-mail address of the vendor of the application are written in a vendor element 512, a telephone element 513, a facsimile element 514, and an email element 515, respectively. Further, a product ID of the application is written in a product-id element 516. A description regarding the application is written in a description element 517. An icon file name of the application is written in an icon element 518.

Information regarding resources necessary for executing applications is written in the resource element 520. For example, a file name (path name) of a JAR file of the application is written as a value of a href attribute 521 of a jar element. Further, a version of the application is written as a value of a version attribute 522.

Further, the security patch 523 is written as a value of a security.patch element. Further, a comment regarding the security patch 523 is written as a value of a comment attribute 524 of the security/patch element. The definition of the security patch 523 is described in detail below.

In Step S103, the application names and list of icons of each activatable application are displayed on the application list screen according to the title elements 511 and the icon elements 518 of the application management file 51.

Then, when the user selects an application (current application) from the applications displayed on the application list screen (Step S104), the SAS manager 310 generates an application setting screen 610 of the current application based on, for example, the application management file 51 associated with the current application and displays the application setting screen 610 on the operations panel 202 (Step S105).

Figure 12:
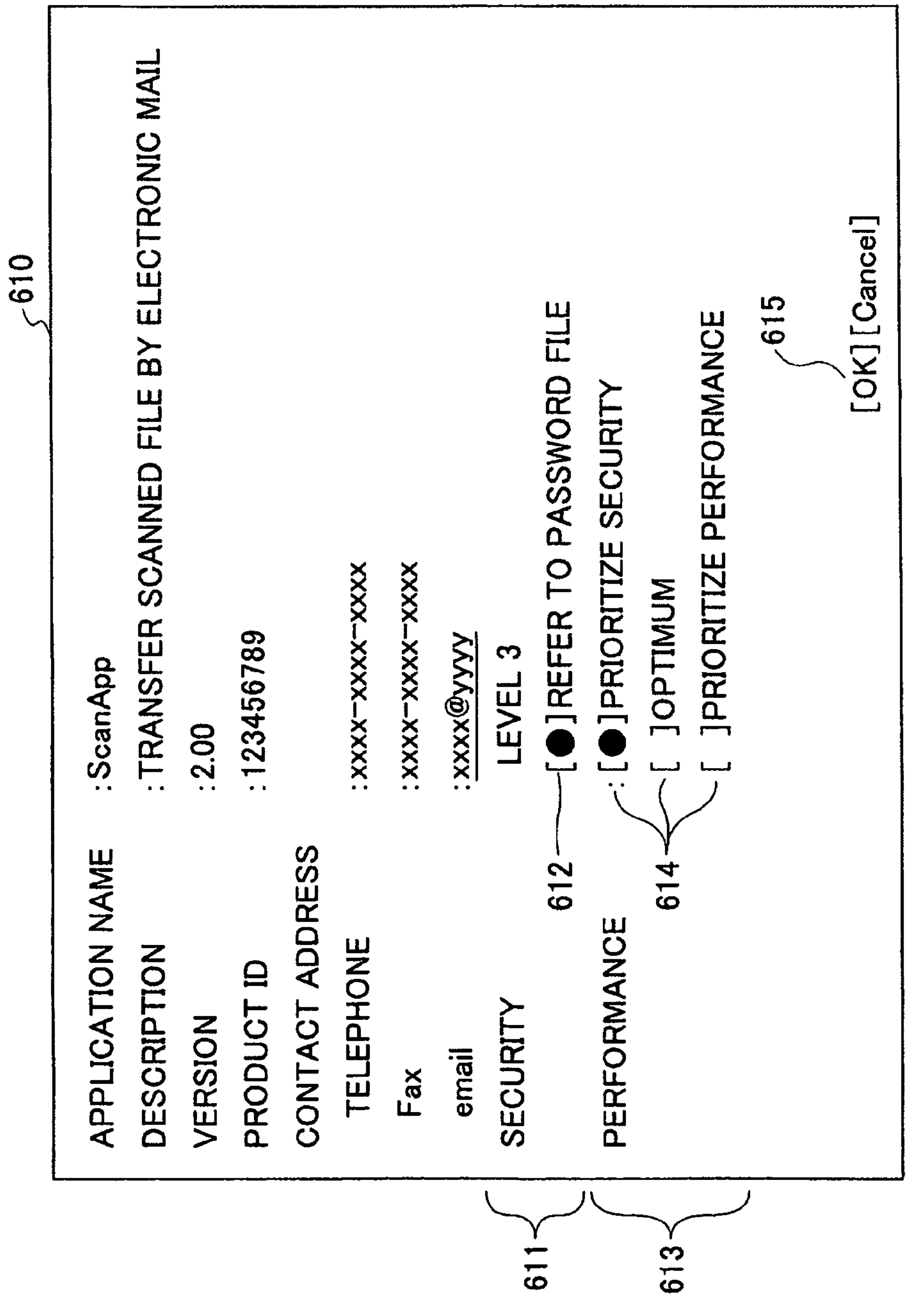
FIG. 12 is a schematic diagram illustrating an example of an application setting screen.

FIG. 12 is a schematic diagram illustrating an example of the application setting screen 610. The application setting screen 610 displays the items "application name", "description", "version", "product ID", and "contact address (including "telephone", "fax", "email")" in the same manner as the data written in the application management file 51.

Information related to or affecting the security level and the security patch 523 (information related to access authorization of the current application) are displayed in a security item 611 and a performance item 613. In FIG. 12, the security item 611 displays a security level (level 3) of the current application and a check button 612 (button for selecting whether to refer to the password file) together with a message "refer to password file". That is, in a case where the current application requires referral to the password file, the user can arbitrarily select whether to allow such referral by marking the check button 612. The SAS manager 310 determines that the level of the current application is level 3 based on the signature 33 of the current application. Further, the character string "refer to password file" is displayed based on a comment attribute 524 of the application management file 51. Further, the password file is a file in which user account information of the multifunction machine 10 is recorded, and is one example of a resource that does not grant reading authorization to an application of level 3 according to the policy configuration file 70.

In the performance item 613, an operation of the current application desired by the user can be selected by marking one of the radio buttons 614 "prioritize security", "optimum", and "prioritize performance". The degree in which a policy defined in the policy configuration file 70 should comply with the current application depends on the selection of the radio buttons 614. The degree of compliance with respect to the policy defined in the policy configuration file 70 decreases in an order starting from "prioritize security"→"optimum"→"prioritize performance". However, as a tradeoff with respect to the decrease of compliance, the performance of the multifunction machine 10 improves.

After the user sets the security item 611 and the performance item 613 and clicks the OK button 615 (Step S5106), the SAS manager 310 records the setting content (content set by the user) to corresponding parameters maintained in the memory or HDD 233 of the multifunction machine 10 (Step S107). More specifically, the setting content with respect to the check button 612 is assigned a value of a password file flag variable (passwdFlag). For example, in a case where the check button 612 is not marked (reference to password file not permitted), "0" is recorded to the password file flag variable. In a case where the check button 612 is marked (reference to password file permitted), "1" is recorded to the password file flag variable. The setting content with respect to the radio buttons 614 is recorded with a value of a performance flag variable (performanceFlag). For example, in a case where the radio button "prioritize security" is marked, "1" is recorded to the performance flag variable. In a case where the radio button "optimum" is marked, "2" is recorded to the performance flag variable. In a case where the radio button "prioritize performance" is marked, "3" is recorded to the performance flag variable. Then, in response to a request from the SAS manager 310, the VM 41 of the JSDK platform 40 activates the current application (Step S108).

Figure 13:
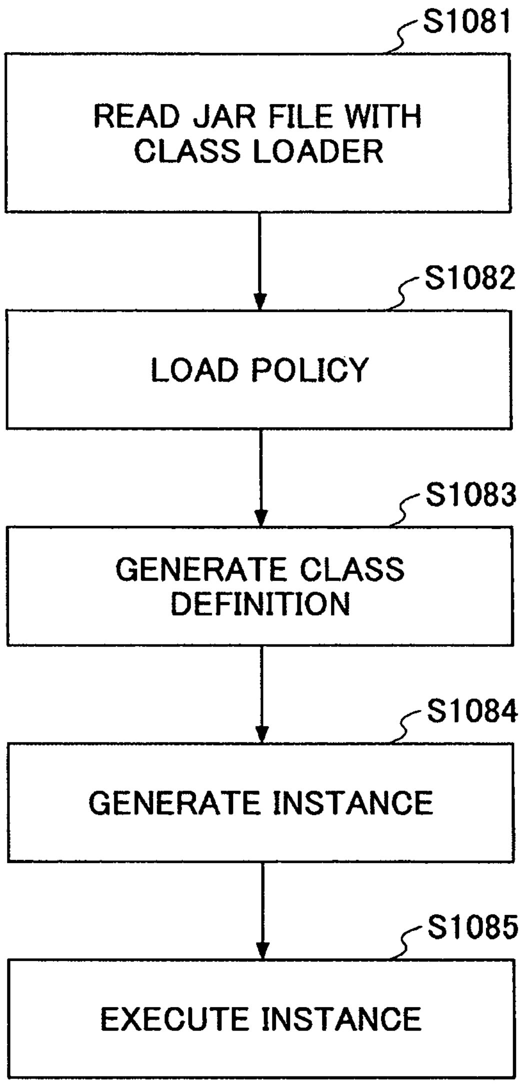
FIG. 13 is a flowchart for describing an activation process of a JSDK application according to an embodiment of the present invention.

Next, the Step S108 is described in further detail. FIG. 13 is a flowchart for describing an activation process of a JSDK application 30 according to an embodiment of the present invention.

In Step S1081, the VM 41 reads the JAR file 31 of the current application 30 into the memory. In this step, the signature 33 of the JAR file 31 is examined. For example, it is determined whether the signature 33 is authentic and whether the JAR file 31 has been tampered with. Accordingly, in a case where the JAR file 31 has no signature 33 or where the JAR file 31 has been tampered with, the activation of the JSDK application 30 is cancelled.

Then, the VM 41 loads a policy corresponding to the security level of the current application 30 (e.g., grant entry corresponding to Lv3) as an object from the policy configuration file 70 (Step S1082).

Figure 14:
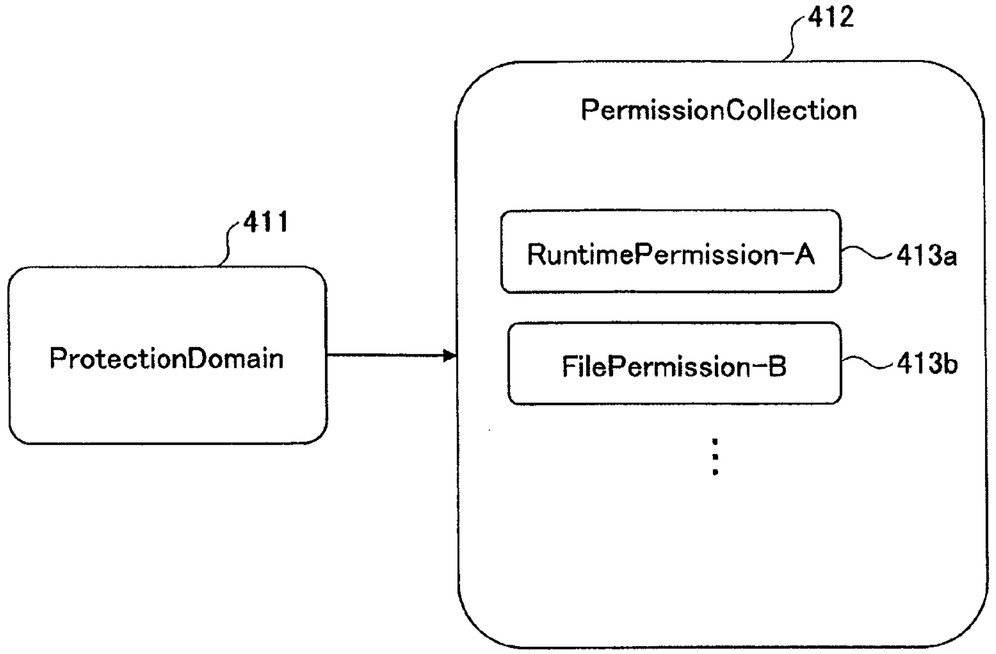
FIG. 14 is a schematic diagram illustrating an example of a policy loaded as an object.

FIG. 14 is a schematic diagram illustrating an example of a policy loaded as an object. In FIG. 14, a ProtectionDomain 411 is an instance of a Protection Domain class corresponding to the above-described Protection Domain. The ProtectionDomain 411 is instantiated with respect to each grant entry corresponding to the security level of the current application in the policy configuration file 70.

A PermissionCollection 412 is an instance of a PermissionCollection class for managing a collection of Permission objects. A Permission object is instantiated based on a concrete class corresponding to an access authorization granted (permitted) according to each permission entry of the policy configuration file 70. In FIG. 14, a RuntimePermission object and a FilePermission object are illustrated as examples of the permission objects.

As illustrated in FIG. 14, the relationship between the ProtectionDomain 411 and the PermissionCollection 412 is associated with the corresponding relationships defined in the policy configuration file 70.

Then, the VM 41 loads the class definition included in the JAR file 33 of the current application 30 in the memory (Step S1083) and instantiates the current application based on the class definition (Step S1084). Then, the VM 41 executes the instantiated current application (Step S1085).

Next, an operation is described where the application executed by the processes illustrated in FIGS. 10 and 13 has the security patch 523 applied and has its policy dynamically changed.

Returning to FIG. 11 illustrating the security patch 523 included in the application management file 51, three permission entries are included in the security patch 523.

The definition of the permission entry 5231 is [permission java. Io.FilePermission "Password.txt", "read", CalledBy "Password:getPassWord", State passwdFlag==1]. This definition corresponds to granting authorization to read the password file (Password. Txt). However, in this embodiment, the authorization to read is granted by the CalledBy field and the State field when a Password: getPassword method is called in a case where the value of the password flag (passwdFlag) is "1" (that is, a case where the check button 612 in the application setting screen 610 is marked).

The definition of the permission entry 5232 is [permission java.security.AllPermission State performanceFlag==2, CalledBy "Apli1:int"]. This definition corresponds to granting all authorizations (All Permission). However, in this embodiment, all the authorizations are granted by the CalledBy field and the State field when an [Apl1:init] method is called in a case where the value of the performance flag (performanceFlag) is "2" (that is, a case where "optimum" is selected as the radio button 613 in the application setting screen 610).

The definition of the permission entry 5233 is [permission java.security.AllPermission State performanceFlag==3, CalledBy "Apli1:dispPassWord"]. This definition corresponds to granting all authorizations (All Permission). However, in this embodiment, all the authorizations are granted by the CalledBy field and the State field when an [Apl1:dispPassWord] method is called in a case where the value of the performance flag (performanceFlag) is "3" (that is, a case where "prioritize performance" is selected as the radio button 613 in the application setting screen 610).

Accordingly, definitions (e.g., password flag, performance flag) are provided in the security patch 523 in correspondence with parameters set in the application setting screen 610. Therefore, the SAS manager 310 may determine the content to be displayed on the application setting screen 610 based on the writing of the security patch 523.

Figure 15:
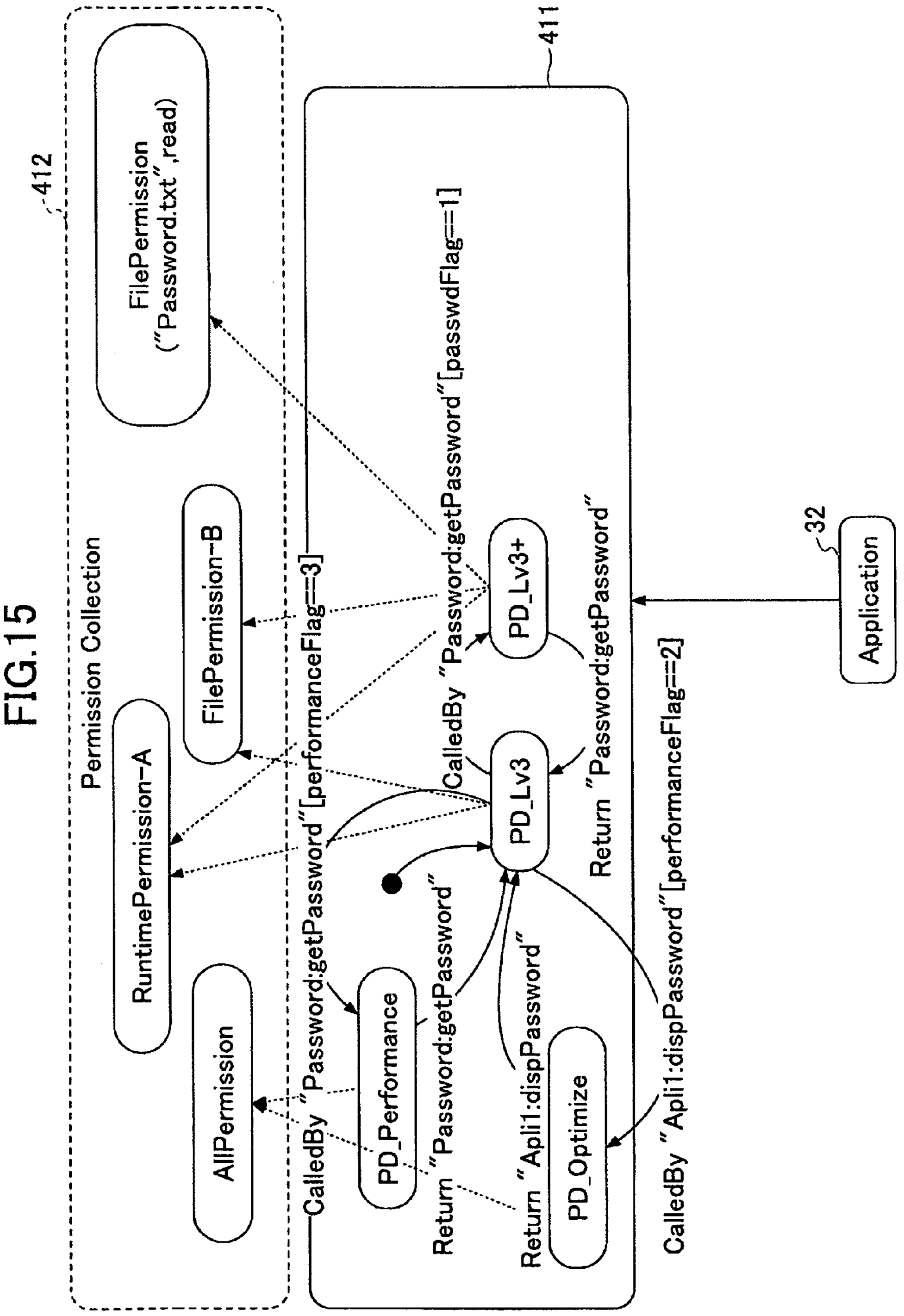
FIG. 15 is a schematic diagram illustrating dynamic changing of policy expressed in the form of state transition of a ProtectionDomain.

The dynamic changing of policy by the security patch 523 can be regarded as a state transition of the ProtectionDomain 411. FIG. 15 is a schematic diagram illustrating dynamic changing of policy expressed in the form of state transition of the ProtectionDomain. The ProtectionDomain 411 and the PermissionCollection 412 with respect to the application 32 are illustrated in FIG. 15. An application 32 of FIG. 15 represents an instance of a current application.

In FIG. 15, the ProtectionDomain 411 includes four states which are state PD_Lv3, state PD_Lv3+, state PD_Optimize, and state PD_Performance.

The state PD_Lv3 occurs prior to the policy being dynamically changed by the security patch 523. In this state, regular access authorization with respect to Lv3 is permitted.

The state PD_Lv3+ is where authorization for reading the password file (Password.txt) is permitted in addition to permitting the authorization of Lv3.

The condition for this transition to this state is that the method [Password. getPassword] is being executed based on the permission entry 5231 of the security patch 523 (see FIG. 11). However, in this embodiment, the password flag being set as "1" by the State entry of the permission entry 5231 serves as a guard condition.

The state PD_Optimize is where all access authorizations are granted. The condition for this transition to this state is that the method [Apli1:init] is being executed based on the permission entry 5232 in a case where the performance flag (performanceFlag) is set with a value "2".

The state PD_Performance is where all access authorizations are permitted. The condition for this transition to this state is that [Apli1:dispPassWord] is being executed based on the permission entry 5233 in a case where the performance flag (performanceFlag) is set with a value "3".

Figure 16:
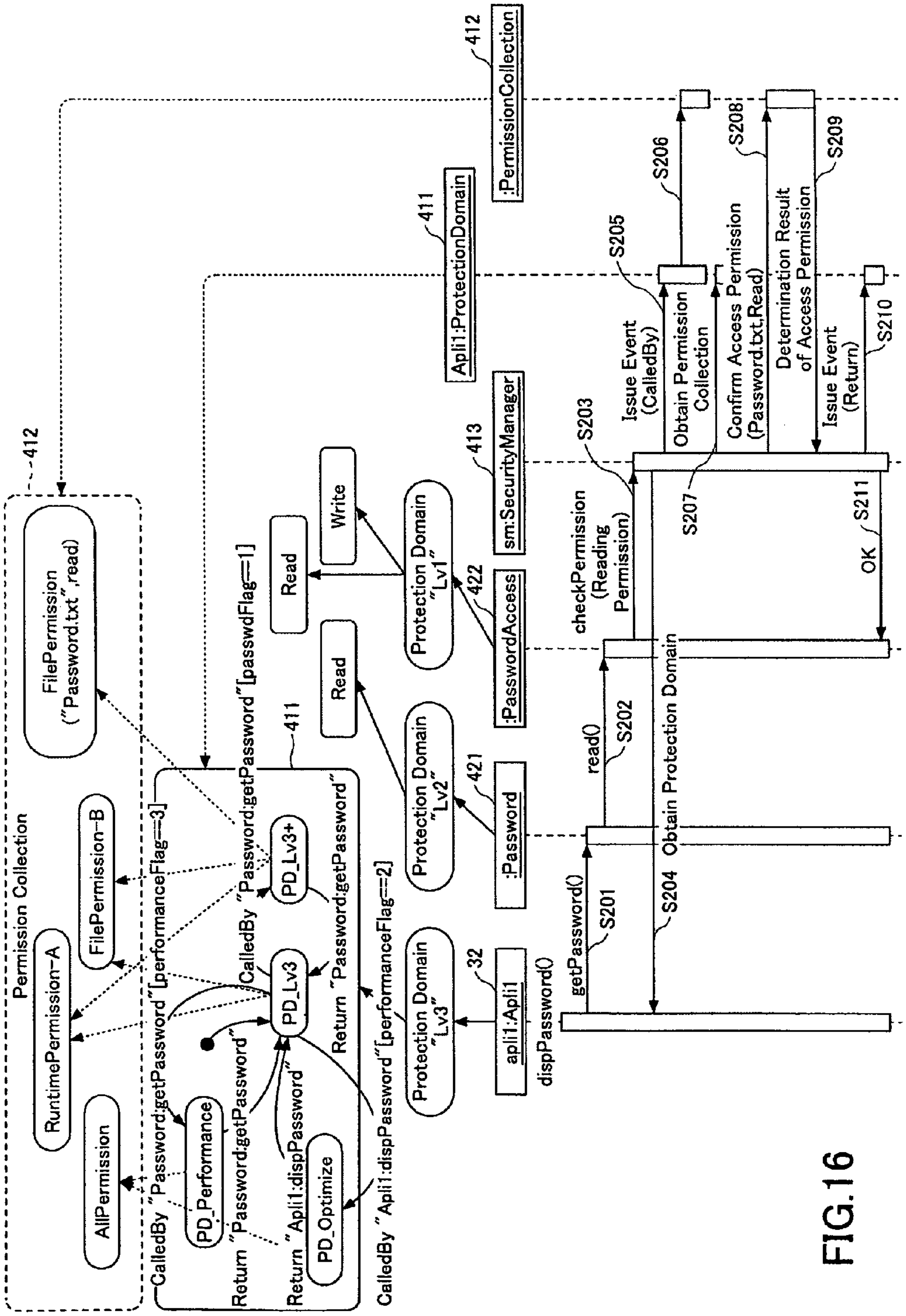
FIG. 16 is a sequence diagram for describing processes performed when dynamically changing policy.

FIG. 16 is a sequence diagram for describing processes performed when dynamically changing policy. FIG. 16 illustrates processes performed in a case where the application 32 requests to refer to a password file.

In FIG. 16, [apli1:Apli1] represents the class name of the current application 32 (Apli1) and the identification name of the instance (apli1). The current application 32 has access authorization corresponding to a protection domain of Lv3 (that is, a security level of Lv3 is assigned to the current application 23). In this embodiment, a Password 421 and a PassWordAccess 422 are instances of the Password class and PassWordAccess class loaded into the JSDK platform 40 for accessing the password file (Password. txt). The Password class has access authorization corresponding to a protection domain of Lv2. The PassWordAccess class has access authorization corresponding to a protection domain of Lv1. Further, sm:SecurityManager 413 is an instance of a class generated for this embodiment by extending a Security Manager class according to the Java (Registered Trademark) standard.

As illustrated in FIG. 16, in terms of permission (access authorization) regarding password files according to the policy configuration file 70, permission to read and permission to write are granted to Lv1 while permission to read is granted to Lv2. On the other hand, neither permission to read nor permission to write is granted to Lv3.

For example, when a dispPassWord method of the current application 32 is called, the current application 32 calls a getPassWord method of the Password 421 in order to obtain password information recorded in a storage device of the multifunction machine 10 (Step S201). Then, a read method (request for referring to password file) is called in the getPassWord method of the Password 421 (Step S202). Because the PasswordAccess 422 is a class which directly accesses the password file, the password access 422 queries whether permission to read the password file is granted by calling the checkPermission method of the sm:SecurityManager 413 in the read method (Step S203).

Then, the sm:SecurityManager 413 obtains a ProtectionDomain 411 corresponding to the current application 32 from the current application 32 (Step S204). It is to be noted that, sm:SecurityManager 413 can identify the current application 32 (class of the current application 32) attempting to access the password file by tracing stack information.

Then, sm:SecurityManager 413 reports that a Apli1:dispPassword method or a Password:getPassword method is called to the ProtectionDomain (Step S205). According to the report, the ProtectionDomain 411 determines whether state transition is necessary according to the security patch 523 (see FIG. 11) of the current application 32.

In this example, a CalledByfield ([CalledBy "Password:getPassWord"]) is added to the permission entry 5231 of the security patch 523, and the report of Step S205 matches the condition of the CalledBy field. Therefore, the ProtectionDomain 411 changes (conducts transition of) its state PD_Lv3 to a state PD_Lv3+ and validates the permission entry 5231. This state transition corresponds to adding a FilePermission object corresponding to the permission entry 5231 to the PermissionCollection 412 (Step S206).

However, in this state, the Apli1:dispPassWord method is in the middle of being executed. Therefore, in a case where the value of the performance flag (performanceFlag) is "3", the ProtectionDomain 411 changes (conducts transition) to a PD_Optimize state and validates the permission entry 5233. In this case, the AllPermission object is added to the PermissionCollection 412.

Assuming that the method being executed (i.e. the method called in Step S201) is Apli1:init in a case where the value of the performance flag (performanceFlag) is "2", the ProtectionDomain 411 changes (conducts transition) to the PD_Optimize state and validates the permission entry 5232. In this case, the AllPermission object is added to the PermissionCollection 412.

Then, the sm:SecurityManager 413 obtains the PermissionCollection 412 from the ProtectionDomain 411 (Step S207). Then, the sm:SecurityManager 413 queries whether permission to read the password file is granted to the PermissionCollection 412 (Step 208). The PermissionCollection 412 determines whether reading permission is granted by confirming whether a Permission object corresponding to reading permission with respect to the password file is included in itself. In this example, the Permission object is added in Step S206. Therefore, the PermissionCollection 412 responds to the query by sending a determination result indicating that the reading permission is granted (Step S209).

Then, the sm:Security Manager 413 reports exiting from the [Password:getPassword] to the ProtectionDomain 411 (Step S210). In response to the report, the ProtectionDomain 411 changes (conducts transition of) itself to its initial state (PD_Lv). Technically, the sm: Security Manager does not exit from the [Password:getPassword] at this timing of reporting to the ProtectionDomain 411. However, in this embodiment, the exiting is reported at this timing because an event with respect to the ProtectionDomain 411 is issued by the SecurityManager 413.

Then, the sm:SecurityManager 413 communicates that access permission (reading permission) is granted to the PasswordAccess 422 (Step S211). In response to the grant, the password file is read. In a case where access permission is not granted, the sm:SecurityManager 413 issues an exception. This exception is reported to the current application 32.

In this embodiment, the event of the ProtectionDomain 411 is issued by the sm:SecurityManager 413. Alternatively, the event may be issued by the current application 32.

With the above-described multifunction machine 10, a policy statically defined in the policy configuration file 70 can be dynamically changed based on the security patch 523. Therefore, the flexibility of access control by a program can be satisfactorily improved.

The above-described embodiment is an example where an entry with a CalledBy field or a State field added is validated (i.e. permission is granted to the entry). Alternatively, the entry with the CalledBy field or the State field added may be invalidated (i.e. permission may be denied to the entry). In such an alternative case, only permission narrower than initially granted permission may be granted in a specific case.

The above-described security function and mechanism with respect to the JSDK application 30 exhibit greater effectiveness in a case where procedures from development and operation of the JSDK application 30 are appropriately executed. Next, an example of procedures (business model) starting from development to operation of the JSDK application 30 is described.

Figure 17:
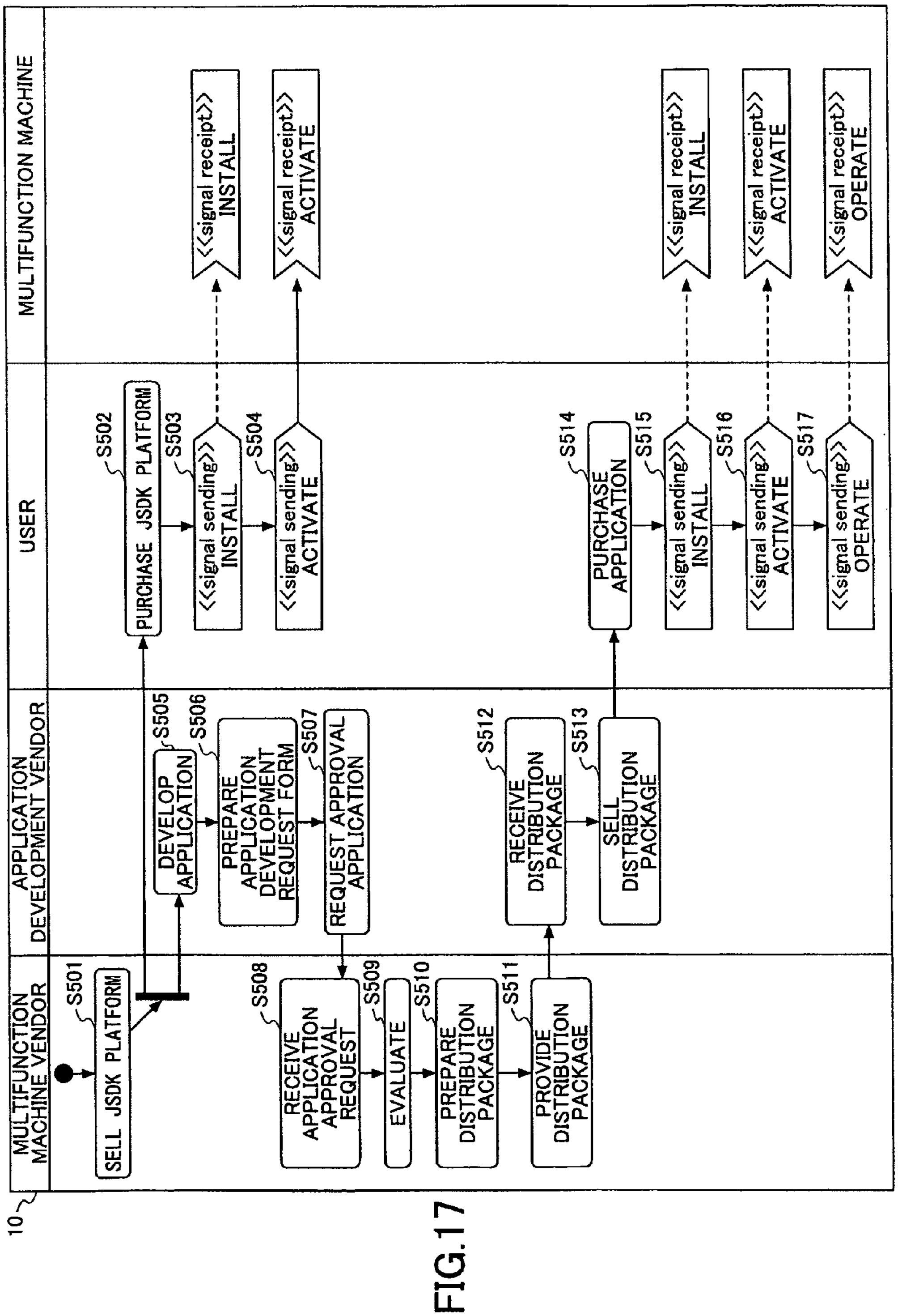
FIG. 17 is a schematic diagram for describing an example of procedures starting from development to operation of a JSDK application.

FIG. 17 is a schematic diagram for describing the example of procedures (business model) starting from development to operation of the JSDK application 30.

First, a multifunction machine vendor (manufacturer of the multifunction machine 10 or an entity providing sales and maintenance or the like of the multifunction machine 10) sells a package including a JSDK application 30 for realizing basic functions of the JSDK platform 40 (hereinafter also referred to as "JSDK package") (Step S501). The multifunction machine vendor attaches a signature 33 beforehand to, for example, the JSDK application 30 included in the JSDK package. The JSDK application 30 included in the JSDK package is developed by the multifunction machine vendor and is assigned with a high credibility security level such as Lv1 or Lv2.

The user of the multifunction machine 10 purchases the JSDK package (Step S502) and installs, for example, the JSDK platform 40 in the multifunction machine 10 of the user (Step S503). The user activates (uses), for example, the JSDK platform 40 and the JSDK application 30 according to necessity (Step S504).

On the other hand, an application development vendor, serving to develop a JSDK application 30 with extended functions, obtains (purchases) the JSDK platform 40 to be used as a platform for development purposes and develops a new JSDK application 30 on the JSDK platform 40 (Step S505). Then, the application development vendor fabricates an application development request form (Step S506) and requests approval of selling the newly developed JSDK application 30 by sending a JAR file of the newly developed JSDK application 30 together with the application development request form to the multifunction vendor (Step S507).

FIG. 18 is a schematic diagram illustrating an example of the application development request form. FIG. 18 illustrates the application development request form including items such as a service bundle, security level, security patch, security patch reason, and performance.

The "service bundle" is an item in which the name of the service bundle used by the JSDK application 30 requested for approval (hereinafter referred to as "request target application") is written. The "security level" is an item in which the security level desired for the request target application is written. The "security patch" is an item in which the security patch 524 according to the format illustrated in FIG. 6 is written according to necessity. The "security patch reason" is an item in which a reason for requiring the security patch 524 is written. The "performance" is an item in which a tradeoff between performance and security of the request target application is written. In this example, relationships between performance and security are written in different levels. A method for invalidating the checking of security (checking of permission (access authorization)) for each level is written. In FIG. 18, the relationships are divided into three levels and written as a) prioritize security, b) optimum, and c) prioritize performance.

When the multifunction machine vendor receives the request for approval (Step S508), the multifunction machine vendor evaluates (tests) the request target application (Step S509). For example, in the evaluation, verification of whether the amount of resources consumed by the request target application is within a predetermined limit and whether there are any security violations (whether the security patch is appropriate). If the request target application is evaluated as being acceptable, the multifunction machine vendor fabricates a distribution package for the request target application (Step S510). The distribution package includes, for example, a JAR file of the request target application and the application management file 51. Further, the signature 33 is attached to the JAR file according to the requested security level. It is to be noted that the multifunction machine vendor fabricates the signature 33 and the application management file 51 based on the application development request form. Next, the multifunction machine vendor provides the distribution package to the application development vendor (Step S511).

Then, the application development vendor receives the distribution package (Step S512) and sells the distribution package (Step S513) to the user. When the user purchases the distribution package (Step S514), the user installs the JSDK application 30 included in the distribution package in the multifunction machine 10 of the user (Step S515). Then, the user activates the JSDK application 30 (Step S516). Then, the user operates the JSDK application 30 (Step S517).

With the above-described procedures, the JSDK application developed by the application development vendor can be assigned a security level and be permitted to apply the security patch 524 under management by the multifunction machine vendor. Therefore, unauthorized execution of applications can be effectively prevented.

With the image forming apparatus, the access controlling method, and the computer-readable recording medium according to the above-described embodiment of the present invention, flexible control of access to programs can be improved.

The present invention is not limited to the specifically disclosed embodiments, and variations and modifications may be made without departing from the scope of the present invention.

The present application is based on Japanese Priority Application No. 2008-118619 filed on Apr. 30, 2008, with the Japanese Patent Office, the entire contents of which are hereby incorporated herein by reference.

What is claimed is:

1. An apparatus to which one or more programs can be added, the apparatus comprising:

a storage part in which password information is recorded;

a managing part configured to manage access authorization information set to each of a plurality of groups, the one or more programs being categorized into the plurality of groups and granted with a range of access authorization to access the password information recorded in the storage part;

a displaying part configured to display the one or more programs including an application program on a setting screen in which access authorization setting information is set in correspondence with each of the one or more programs;

a changing part configured to change the range of access authorization granted to the one or more programs via the setting screen based on access authorization change information, the access authorization change information including definitions of change information corresponding to the access authorization setting information set in the setting screen; and a determining part configured to determine whether the access authorization can be granted to the one or more programs;

wherein the changing part is further configured to change the range of access authorization granted to the one or more programs when the access authorization setting information matches a predetermined definition included in the access authorization change information, wherein the changing part is configured to change the range of access authorization granted to the one or more programs in response to a request from the application program displayed on the setting screen.

2. The apparatus as claimed in claim 1, wherein the access authorization change information is recorded in association with each of the one or more programs in the storage part.

3. The apparatus as claimed in claim 1, wherein the definitions of the access authorization change information correspond to values of parameters that change according to the access authorization setting information set in the setting screen.

4. The apparatus as claimed in claim 3, wherein the definitions of the access authorization change information include changing the range of access authorization granted to the one or more programs according to the access authorization setting information set in the setting screen.

5. The apparatus as claimed in claim 1, wherein the access authorization change information includes a method name that designates the timing for changing the range of access authorization granted to the one or more programs.

6. An access controlling method executed by an apparatus to which one or more programs can be added, the method comprising the steps of:

managing access authorization information set to each of a plurality of groups, the one or more programs being categorized into the plurality of groups and granted with a range of access authorization to access password information recorded in a storage part of the apparatus;

displaying the one or more programs including an application program on a setting screen in which access authorization setting information is set in correspondence with each of the one or more programs;

changing the range of access authorization granted to the one or more programs via the setting screen based on access authorization change information, the access authorization change information including definitions of change information corresponding to the access authorization setting information set in the setting screen; and determining whether the access authorization can be granted to the one or more programs;

wherein the changing further includes changing the range of access authorization granted to the one or more programs when the access authorization setting information matches a predetermined definition included in the access authorization change information, wherein the changing of the range of access authorization granted to the programs is responsive to a request from the application program displayed on the setting screen.

7. The access controlling method as claimed in claim 6, further comprising a step of:

recording the access authorization change information in the storage part of the apparatus in association with each of the one or more programs.

8. The access controlling method as claimed in claim 6, wherein the definitions of the access authorization change information correspond to values of parameters that change according to the access authorization setting information set in the setting screen.

9. The access controlling method as claimed in claim 6, wherein the definitions of the access authorization change information include changing the range of access authorization granted to the one or more programs according to the access authorization setting information set in the setting screen.

10. The access controlling method as claimed in claim 6, wherein the access authorization change information includes a method name that designates the timing for changing the range of access authorization granted to the one or more programs.

11. A non-transitory computer-readable recording medium on which a program for causing an apparatus to execute an access controlling method is recorded, the apparatus being able to have one or more programs added, the access controlling method comprising the steps of:

managing access authorization information set to each of a plurality of groups, the one or more programs being categorized into the plurality of groups and granted with a range of access authorization to access password information recorded in a storage part of the apparatus;

displaying the one or more programs including an application program on a setting screen in which access authorization setting information is set in correspondence with each of the one or more programs;

changing the range of access authorization granted to the one or more programs via the setting screen based on access authorization change information, the access authorization change information including definitions of change information corresponding to the access authorization setting information set in the setting screen; and determining whether the access authorization can be granted to the one or more programs;

wherein the changing further includes changing the range of access authorization granted to the one or more programs when the access authorization setting information matches a predetermined definition included in the access authorization change information, wherein the changing of the range of access authorization granted to the programs is responsive to a request from the application program displayed on the setting screen.

12. The non-transitory computer-readable recording medium as claimed in claim 11, wherein the access controlling method further includes a step of recording the access authorization change information in the storage part of the apparatus in association with each of the one or more programs.

13. The non-transitory computer-readable recording medium as claimed in claim 11, wherein the definitions of the access authorization change information correspond to values of parameters that change according to the access authorization setting information set in the setting screen.

14. The non-transitory computer-readable recording medium as claimed in claim 11, wherein the definitions of the access authorization change information include changing the range of access authorization granted to the one or more programs according to the access authorization setting information set in the setting screen.

15. The non-transitory computer-readable recording medium as claimed in claim 14, wherein the access authorization change information includes a method name that designates the timing for changing the range of access authorization granted to the one or more programs.

16. The apparatus as claimed in claim 1, wherein the predetermined definition includes a definition of a permission entry, wherein the predetermined condition includes a password flag and a performance flag.

17. The method as claimed in claim 6, wherein the predetermined definition includes a definition of a permission entry, wherein the predetermined condition includes a password flag and a performance flag.

18. The non-transitory computer-readable recording medium as claimed in claim 11, wherein the predetermined definition includes a definition of a permission entry, wherein the predetermined condition includes a password flag and a performance flag.

* * * * *